US011146382B2

(12) United States Patent
Lapworth

(10) Patent No.: US 11,146,382 B2
(45) Date of Patent: Oct. 12, 2021

(54) STRUCTURED FILE ENCRYPTION PROCESS

(71) Applicant: ROLLS-ROYCE plc, London (GB)

(72) Inventor: Bryan L. Lapworth, Derby (GB)

(73) Assignee: ROLLS-ROYCE PLC, London (GB)

( * ) Notice: Subject to any disclaimer, the term of this patent is extended or adjusted under 35 U.S.C. 154(b) by 262 days.

(21) Appl. No.: 16/391,613

(22) Filed: Apr. 23, 2019

(65) Prior Publication Data

US 2019/0349186 A1    Nov. 14, 2019

(30) Foreign Application Priority Data

May 10, 2018   (GB) ..................................... 1807612

(51) Int. Cl.
  *G06F 21/60* (2013.01)
  *H04L 9/06* (2006.01)
  *G06F 16/25* (2019.01)

(52) U.S. Cl.
  CPC .......... *H04L 9/0637* (2013.01); *G06F 16/258* (2019.01); *G06F 21/602* (2013.01); *H04L 2209/38* (2013.01)

(58) Field of Classification Search
  CPC . H04L 9/0637; H04L 2209/38; G06F 16/258; G06F 21/602
  See application file for complete search history.

(56) References Cited

U.S. PATENT DOCUMENTS 9,942,211 B1 *   4/2018   Campagna ............... H04L 63/06
9,979,537 B2 *   5/2018   Murray .................... G09C 1/00
2001/0033656 A1 *  10/2001  Gligor .................. H04L 9/0656
                                                    380/28
2002/0071552 A1   6/2002  Rogaway
2006/0245588 A1  11/2006  Hatakeyama
2009/0013016 A1 *  1/2009  Noll ..................... G06F 21/6209

(Continued)

FOREIGN PATENT DOCUMENTS

EP    0 908 810 A2    4/1999
EP    1 294 124 A2    3/2003

OTHER PUBLICATIONS

Great Britain search report dated Nov. 29, 2018, issued in GB Patent Application No. 1807612.5.

(Continued)

*Primary Examiner* — Joseph P Hirl
*Assistant Examiner* — Stephen T Gundry
(74) *Attorney, Agent, or Firm* — Crowell & Moring LLC

(57) ABSTRACT

Method and system for cryptographic transformation of a structured data set. The structured data set is partitioned into a first subset and a plurality of further subsets for encryption in parallel. The subsets are divided into a plurality of blocks of predetermined size. A first block for each subset is identified as well as a location of each further block in said subset relative to said first block of its subset. Cryptographic transformation of the data subsets is performed using a key according to a block chain process and an offset value for the first block of each subset from the first block of the first subset is logged. The process allows a block chain to be broken into part way in the chain. The process may allow different partitioning to be used for decryption than was used for encryption, thereby allowing parallel processing on varying numbers of computational cores.

18 Claims, 13 Drawing Sheets

(56) References Cited

U.S. PATENT DOCUMENTS

| | | | |
|---|---|---|---|
| 2012/0173880 A1* | 7/2012 | Swaminathan | H04L 9/0637 713/189 |
| 2014/0156806 A1* | 6/2014 | Karpistsenko | G06Q 50/28 709/219 |
| 2015/0095252 A1* | 4/2015 | Mattsson | G06Q 50/265 705/325 |
| 2015/0143112 A1* | 5/2015 | Yavuz | H04L 9/00 713/165 |
| 2015/0195091 A1* | 7/2015 | Kubota | G06F 21/6227 713/191 |
| 2016/0218860 A1* | 7/2016 | Murray | H04L 9/065 |
| 2017/0206372 A1* | 7/2017 | Jung | G06F 16/951 |
| 2018/0011865 A1* | 1/2018 | Bowman | G06F 16/137 |
| 2018/0074975 A1* | 3/2018 | Deutsch | G06F 3/0619 |
| 2018/0191716 A1* | 7/2018 | Chhabra | H04L 9/0897 |
| 2018/0191807 A1* | 7/2018 | Dawes | H04L 67/12 |
| 2018/0232527 A1* | 8/2018 | Haager | G06F 21/602 |
| 2018/0254901 A1* | 9/2018 | Egorov | H04L 9/0825 |
| 2018/0337896 A1* | 11/2018 | Frankel | H04L 9/088 |
| 2019/0026476 A1* | 1/2019 | Van Riel | G06F 21/6218 |
| 2019/0036678 A1* | 1/2019 | Ahmed | H04L 9/302 |
| 2019/0129887 A1* | 5/2019 | Bowman | H05K 999/99 |
| 2019/0165804 A1* | 5/2019 | Amaral | H03M 7/46 |
| 2019/0238312 A1* | 8/2019 | Dickens, III | H04L 9/0643 |
| 2019/0342075 A1* | 11/2019 | Karame | H04L 9/0643 |

OTHER PUBLICATIONS

Extended European Search Report, issued in EP Application No. 19168701.1, dated Sep. 6, 2019, pp. 1-7, European Patent Office, Munich, Germany.

* cited by examiner

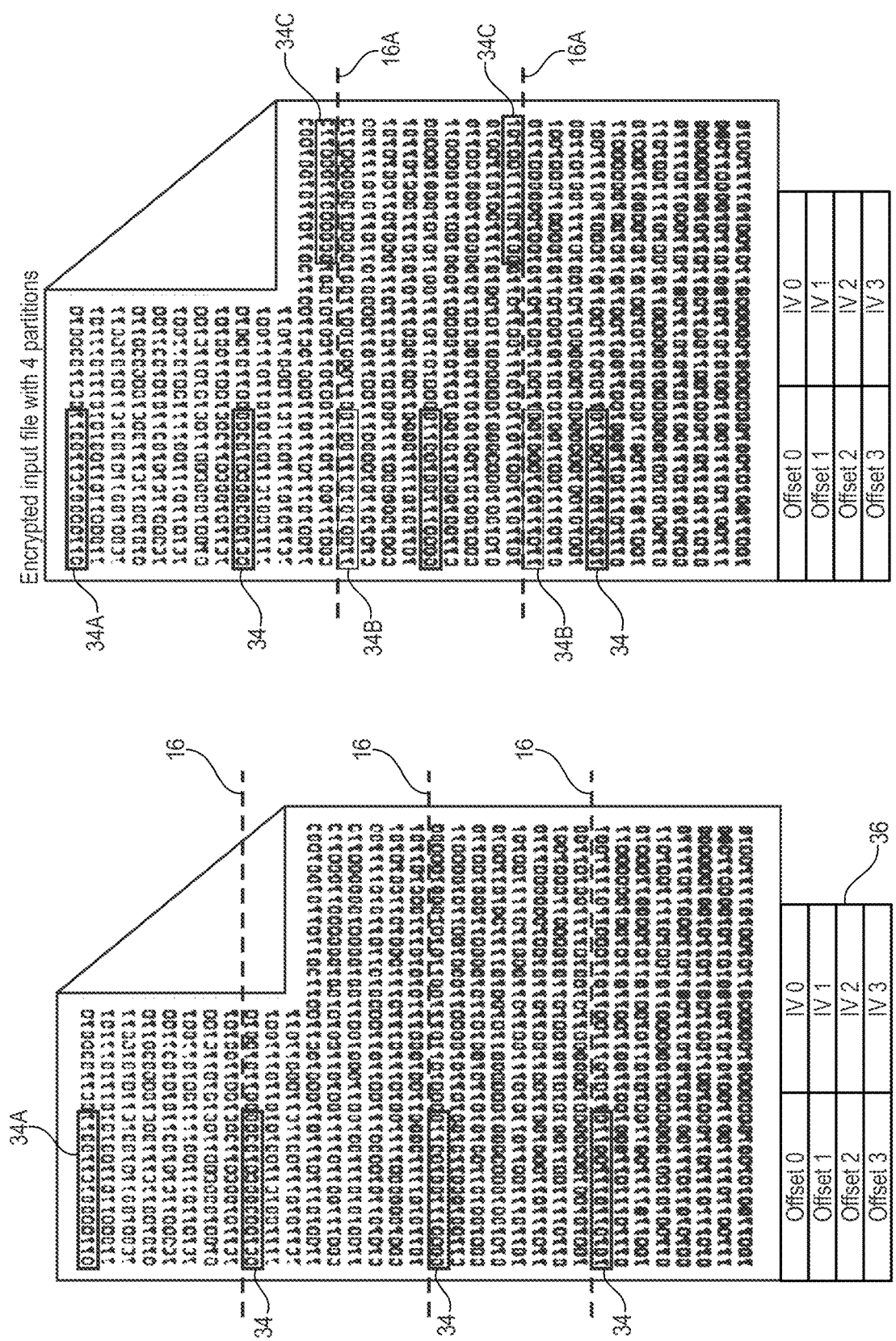

STRUCTURED FILE ENCRYPTION PROCESS

CROSS-REFERENCE TO RELATED APPLICATIONS

This application is based upon and claims the benefit of priority from British Patent Application No. GB 1807612.5, filed on 10 May 2018, the entire contents of which are incorporated by reference.

BACKGROUND

Technical Field

The present disclosure concerns file encryption and decryption processes, particularly for files having a predetermined data structure/topology.

Description of the Related Art

Engineering geometry and simulation tools, such as computational fluid dynamics (CFD) and finite element analysis (FEA) software, require definition of a domain to be modelled, e.g. as a computer aided design (CAD) model representing the geometry of an area/volume to be studied. CFD and FEA techniques require discretisation of the domain, i.e. the geometric definition of the relevant area/volume, into a network of adjoining cells/elements. A complex simulation (numerical analysis) for the domain as a whole is split into individual calculations for each cell/element, with the output of each being fed to the next until as solution of the domain has been attained.

The process of domain discretisation is referred to as 'meshing' the domain/geometry. Various structured, unstructured or hybrid meshing approaches are available, using different shapes of cells, each of which result in a significant number of points over the domain defining locations within the mesh. Each point may be represented as a location in a 2D or 3D coordinate system.

When a numerical analysis is run on the meshed geometry/domain, this results in additional data being generated at each point corresponding to the variables being calculated, such as forces/pressures, temperatures, velocities, etc.

There is a clear need to be able to share such engineering geometry files and simulation results securely.

AES (Advanced Encryption Standard) was established by the US National Institute of Standards and Technology in 2001 as the recognised standard required by the United States federal government. It has also become an international encryption/decryption standard.

AES works on 128 bit blocks of plain text and performs several 'rounds' to create the encrypted cipher text. The user must provide a secret key for the encryption. AES is a symmetric cipher and the same secret key is used for decryption.

A cryptographic weakness of AES is that the secret key is used with each 128 bit block and so patterns in the original plain text are visible in the cipher text. Information about the encrypted file contents may be inferred from the pattern if the recipient has knowledge about the nature of the data therein.

One additional complexity with engineering simulation tools, such as CFD and FEA, is that they are computationally expensive. There is often a need to share the simulation job over a number of processors in order to achieve a solution in a practical manner. Simulation codes such as CFD adopt a domain decomposition approach to running a job in parallel. If the code is to be executed on N cores, then the CFD mesh is divided in N roughly equal domains and each domain is allocated to one of the N cores. Here, N can range currently from order 10's to 1,000,000's of cores/domains, the number increasing with the development of larger computers. Each core reads and writes its data to and from a master file which contains the entire mesh.

At the time of encryption, the number of cores on which the job will be run may not be known. The number of cores used to encrypt the data may differ from the number of cores used to decrypt the data. Using conventional encryption methods, it is a problem to divide up the encrypted file in an ad-hoc manner and decrypt the individual parts thereof.

It is an aim of the disclosure to provide a cryptographic transformation processes which mitigates or resolves one or more of the above-identified problems.

SUMMARY

According to a first aspect of the present disclosure there is provided a method of encryption of a structured data set comprising: partitioning the structured data set into a first subset and a plurality of further subsets; dividing the subsets into a plurality of blocks of predetermined size; identifying a first block for each subset and a location of each further block in said subset relative to said first block of its subset; encrypting the data subsets using a block chain encryption process, and logging an offset value for the first block of each subset from the first block of the first subset.

According to a second aspect of the present disclosure there is provided a method of decryption of an structured encrypted data set comprising: partitioning the structured encrypted data set into a first subset and a plurality of further subsets; dividing the subsets into a plurality of blocks of predetermined size; identifying a first block for each subset and a location of each further block in said subset relative to said first block of its subset; identifying an offset value for the first block of each subset from the first block of the first subset; and, decrypting each block of each data subset using a block chain decryption process, wherein the first block of each subset is decrypted according to said offset value.

The block chain encryption and/or decryption process for each subset may be performed in parallel, e.g. using a number of cores. The process may permit decryption in parallel, e.g. using a number of subsets which is the same as or different from the number of subsets used for encryption.

The method may comprise identifying a number of available cores for the encryption/decryption process and partitioning the structured data set into the number of subsets based on said number of cores.

The method may comprise assigning one or more subset to each of a plurality of cores for cryptographic transcription. The method may comprise dividing the data set based on the available number of cores and/or substantially equally over the available number of cores.

The offset value may comprise a location/position of each subset in the data set structure relative to the first subset. The offset value may comprise or indicate a location/position of the first block of each subset relative to the first subset and/or the first block of the first subset.

The plurality of blocks may collectively define the entire data of the subset. The blocks may be adjoining and/or sequential.

Each block in a subset may be sequentially identifiable from a preceding block in the subset and/or the first block in that subset. Each block in a subset may comprise a sequential identifier.

The first block in a subset may or may not comprise the first/leading block of the sequence of blocks in the subset. The first block may be mid-way in the sequence of blocks in the subset.

The first block in each further subset may comprise a sequential identifier which follows in sequence from the identifier of a last block of a preceding data subset.

The sequential identifier may comprise a count or counter value. The offset value may comprise the counter value and/or the counter value may be additional to the subset offset value.

A partition counter value may be logged for each partition/subset, e.g. in addition to a block counter value for each block in that subset.

The partitions and/or subsets may be sequential and or may define an adjoining series of subsets in the structured data set.

Each data subset may comprise a plurality of rows or lines of the data set.

The data subsets may be substantially equal in size.

An initialization vector may be used, applied and or logged for the first block of each subset. The initialization vector may be used for cryptographic transformation. The initialization vector may be a nonce.

A cypher block chain encryption/decryption mode may be used.

A counter block chain encryption/decryption mode may be used.

The decryption process may comprise identifying/finding and decrypting one or more first block contained in each subset, e.g. according to the offset values. The process may comprise logging the decrypted/plain text for each identified first block. The process may comprise finding a sequentially preceding and/or following block relative the first block.

The method may comprise identifying a last block of each subset.

The method may comprise dividing each subset into a whole number of blocks of predetermined size.

The method may comprise padding one or more block of each subset in order to meet the predetermined block size.

The data set may comprise geometric data, e.g. geometric model data. The data set may comprise a physics-based model data set. The data set may comprise a CAD model, CFD model, FEA model, or similar model type. The data set may comprise geometric mesh data.

The data set may comprise point data, e.g. coordinate data for a suitable 2D or 3D coordinate system, such as a Cartesian, cylindrical, spherical coordinate system, etc. The point data may comprise 1,000s, 10,000s, 100,000s, 1,000,000s, 10,000,000s, 100,000,000s or 1,000,000,000 of points or more.

The data set may comprise point data and data for one or more variable at each point.

The data set may comprise mesh data and/or model solution data.

The method may comprise decrypting the data set, running numerical analysis or processing of the decrypted data, e.g. over a plurality of cores, and re-encrypting the processed data, e.g. using the same plurality of cores as for the numerical analysis/processing.

According to a third aspect of the present disclosure, there is provided a data carrier or data storage medium comprising machine readable instructions for one or more processor to perform the method of the first or second aspects.

The one or more processor may control a cryptographic transformation process. The one or more processor may comprise one or more first processor for partitioning the structured data set and assigning the subsets to a plurality of further processors for performing the cryptographic transformation process on the subset assigned to it by the first processor.

According to a fourth aspect of the invention, there is provided a system for performing a cryptographic transformation process in parallel across a plurality of computer processors wherein the plurality of processors operate in accordance with the method of the first or second aspect, or under the control of the machine readable instructions of the third aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which:

FIG. 11 shows an example data set or file encrypted in parallel using a first number of partitions but decryptable using a different number of partitions;

FIG. 12 shows the decryption of the encrypted output stemming from FIG. 11 but using a second number of partitions;

DETAILED DESCRIPTION

The following description refers to cryptographic transformation of data, which may otherwise be referred to as cryptographic translation or encryption/decryption.

Figure 1:
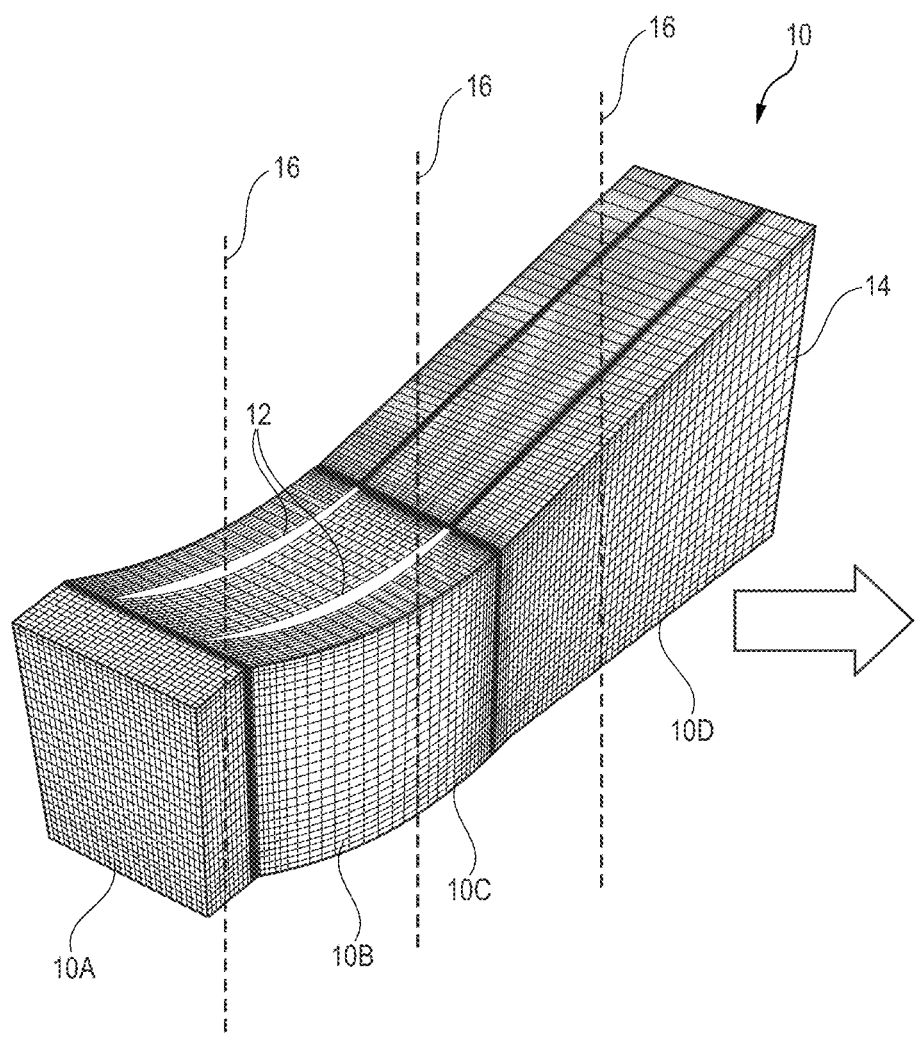
FIG. 1 is a three-dimensional view of a geometric domain of a computational model.

Turning firstly to FIG. 1, there is shown a geometric domain 10 of a computational model, in this case a CAD model 11 that is prepared for CFD analysis. The domain 10 defines the geometric boundaries, i.e. the extent of the domain as represented by the end, side, upper and lower walls of the domain. The domain in this example is therefore a three-dimensional domain defined according to a Cartesian coordinate system. In other examples, a two-dimensional domain could be used as well as other types of conventional coordinate systems.

Within the domain, there is defined the geometry of one or more body 12, in this example taking the form of one or more aerofoil 12 within the domain. The surfaces of the body 12 are geometrically defined such that the solid body interior is captured and the surrounding space in the domain. The surrounding space is modelled in this example as a fluid medium for CFD analysis.

The fluid portion of the domain 10 is discretised into multiple adjoining cells by application of a mesh 14 thereover. The mesh is thus an intersecting framework of links/edges defining a grid-like structure. Depending on the size of the domain and the level of accuracy required, the cell count could be of an order anywhere between thousands and billions ($10^9$) or trillions of cells. The cells may be considered akin to voxels for a three-dimensional domain.

In the example shown it can be seen that the cell density need not be uniform over the whole domain 10 and greater numbers of cells may be used where greater accuracy/fidelity is needed, e.g. where a more complex flow regime is expected.

The mesh is defined by point data within the domain. The points provide locations at which numerical analysis will be performed. The numerical analysis or computational modelling in this example comprises solving a plurality of physics-based equations representing the flow behaviour through the domain (e.g. conservation of mass, energy, momentum equations). For a set of input boundary conditions, the numerical analysis is performed for each cell in order to arrive at a solution for the whole domain. Typically an iterative approach is used to converge on the solution.

The relevant data may thus comprise the geometric domain data itself, or else the solution data, comprising the domain data and the values for the relevant variables at each point of the domain.

In FIG. 1, a plurality of partitions 16 have been defined in order to allow the domain 10, including the mesh 14, to be broken up into a number of subdomains or subsections 10A, 10B, 100 and 10D. The subdomains 10A-D may be of substantially equal size or cell count but this is not essential.

Figure 2:
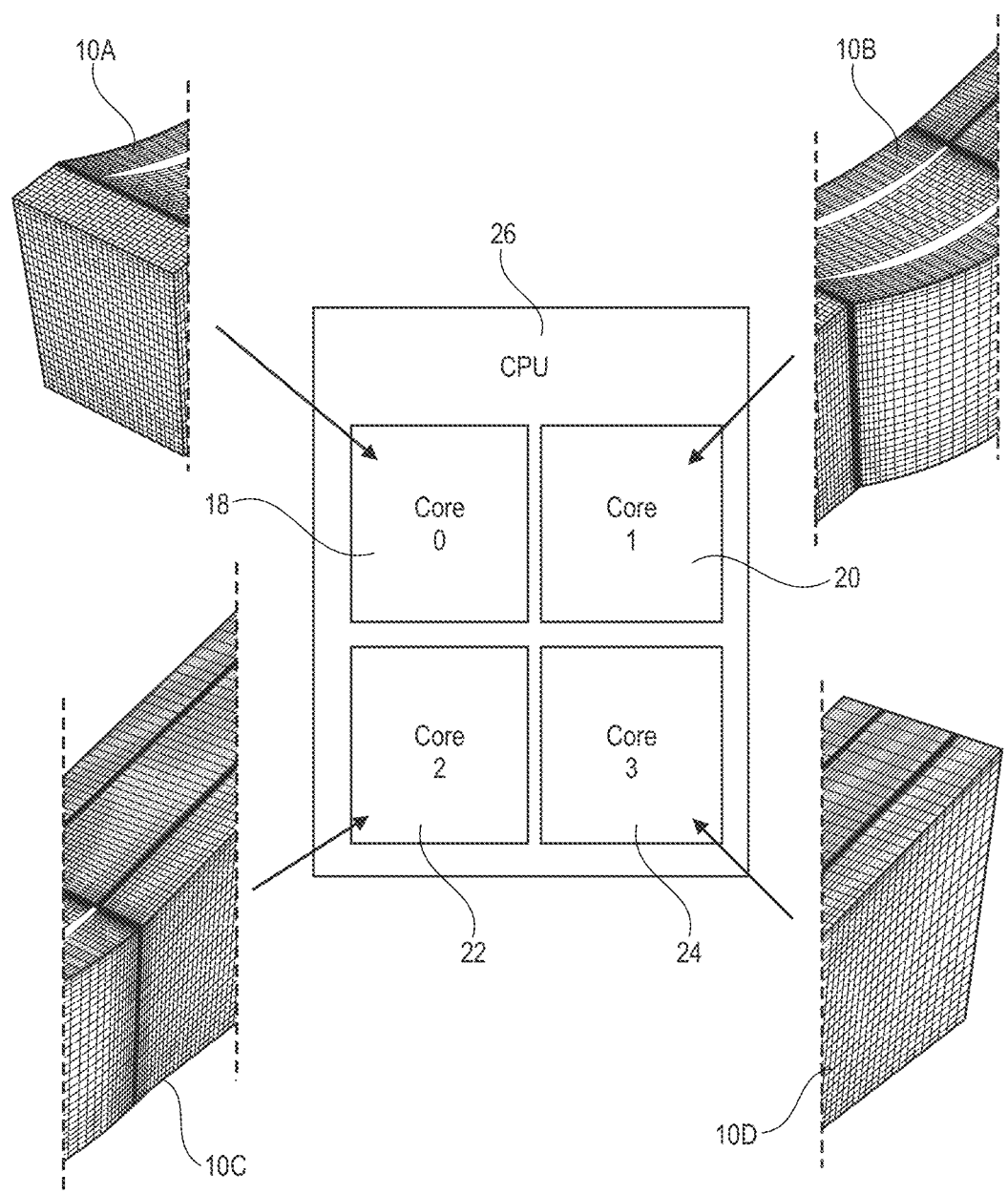
FIG. 2 is a schematic view of the partitioning of the geometric domain for computational processing in parallel.

FIG. 2 shows how the different subdomains of the geometric domain 10 can be assigned to different processors/cores 18, 20, 22 and 24 of a computational system/network 26 for computational processing. Sharing the computational job in this manner can greatly increase the speed with which the numerical analysis can be performed.

Figure 3:
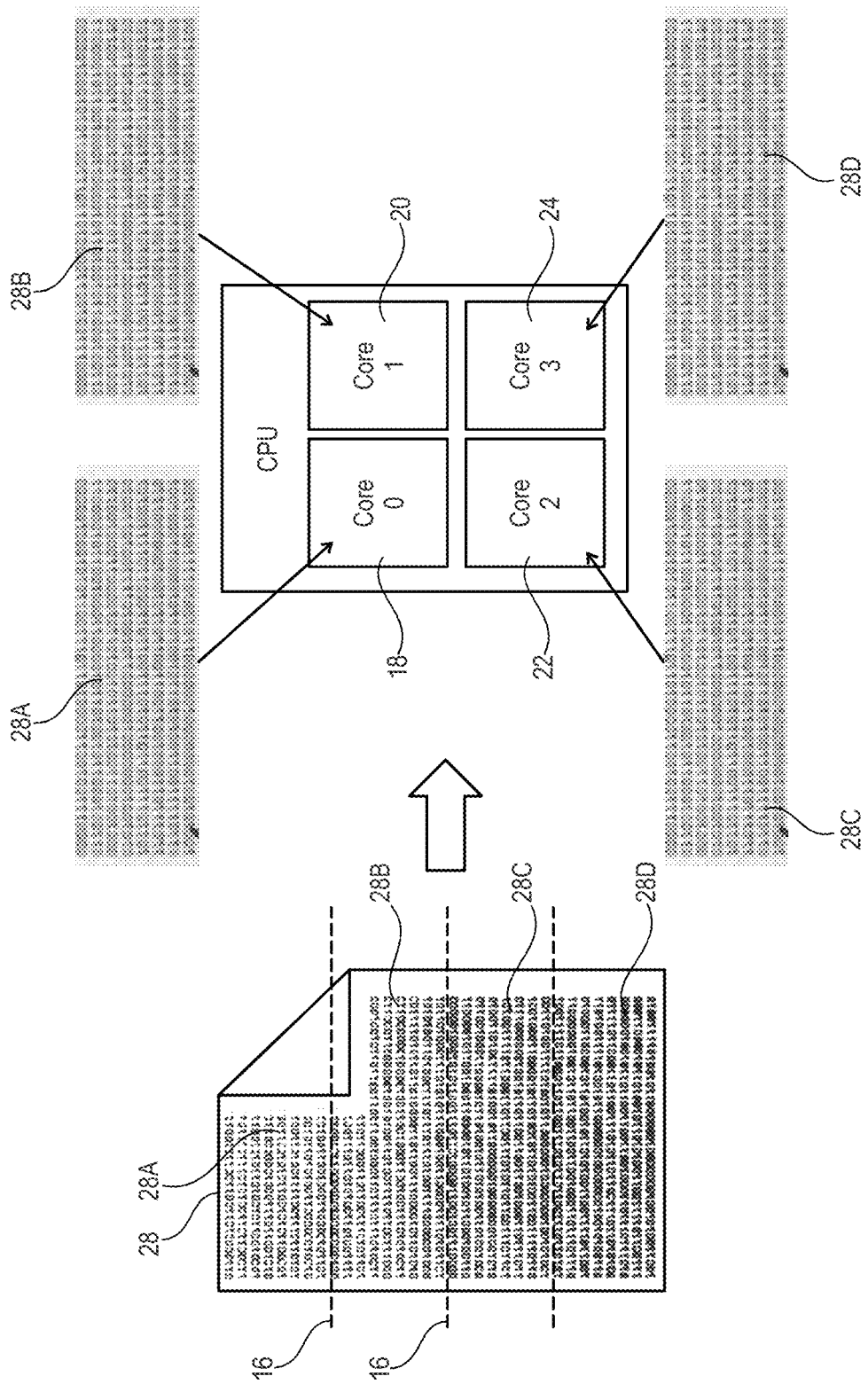
FIG. 3 is a schematic of the partitioning of a data set/file into subsets for parallel processing.

FIG. 3 shows a data set/file 28 for the domain 10 shown in FIG. 1 and how the partitions 16 are used to divide up the data set 28 into subsets 28A, 28B, 28C, 28D corresponding to the domain subdomains 10A-D.

The data subsets 28A-D are assigned to the cores 18-24.

In the examples shown, only three partitions 16, i.e. four domain subdomains and data sets, are shown for simplicity. It will be appreciated by the skilled person that one or two partitions could be used if desired but that typically many more partitions would be used. Similarly, the computational processing system is represented as a four-core CPU 16 but could include any number of cores/processors operable in parallel, e.g. as a single computer or multiple computers connected over a network.

Figure 4:
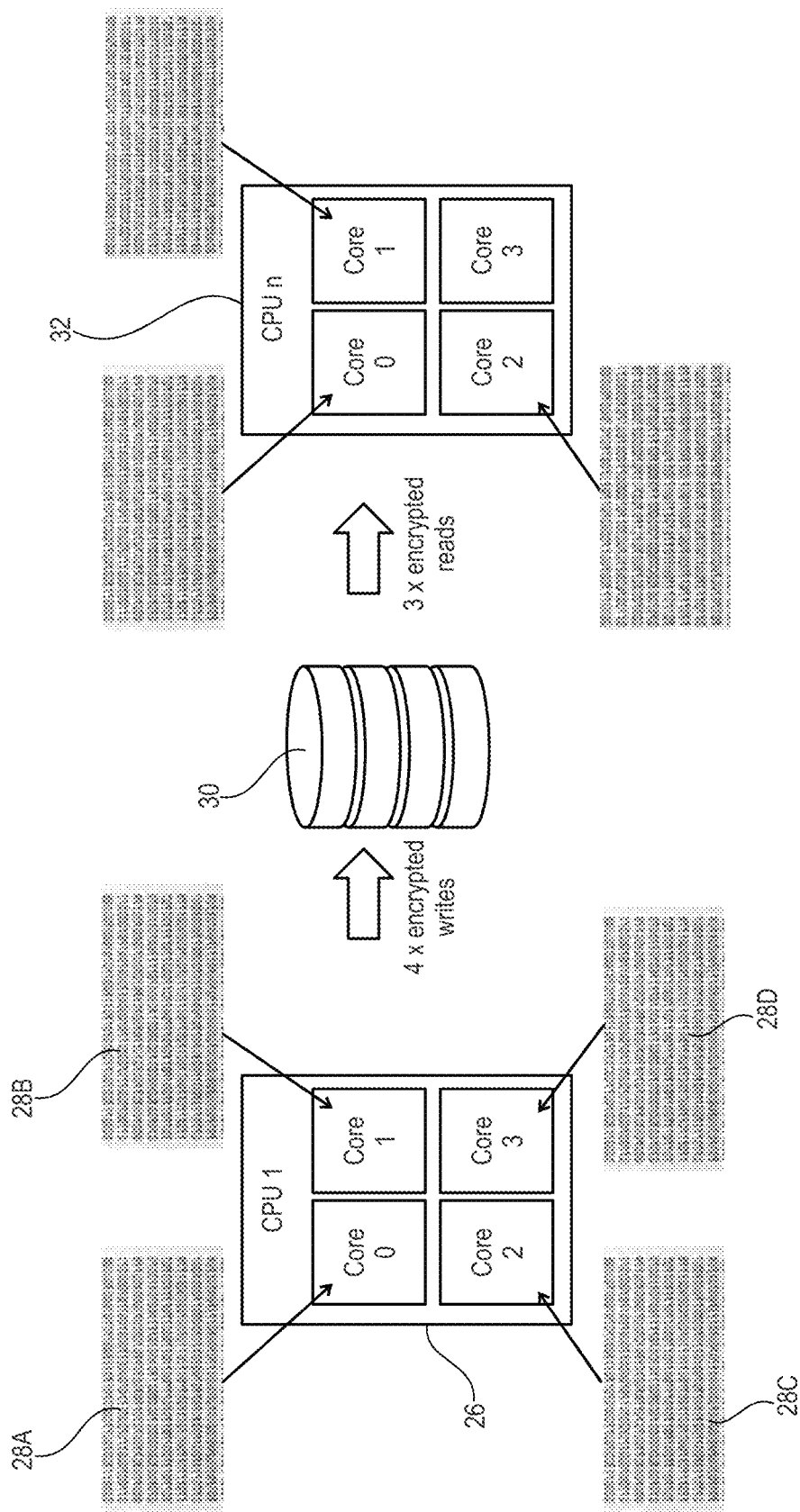
FIG. 4 shows the process of encrypting, storing and retrieving a partitioned data set.

Turning to FIG. 4, there is shown an example of use of the methods and systems disclosed herein. The data subsets 28A-D are encrypted according to a suitable encryption standard using the available cores 28A-D and written to a data store 30 but it is later desirable to read and decrypt/process the data from the data store using a different number of cores 32. It may be desirable to encrypt, e.g. using AES, the mesh and also the solution which is decomposed using the same domains as the mesh. It is desirable to decrypt the mesh as it is read and encrypt the solution as it is written.

It would be desirable if successive encryption/decryption cycles for the same geometric domain and/or solution data could make use of different numbers and locations of partitions 16.

The examples of the disclosure below are based upon the application of four common principles as follows:
(i) The data set must be divisible into blocks of a common size, e.g. 128 bit
(ii) Partitioning must fall on a block boundary
(iii) Enhanced/secure block cipher modes are applied to each domain subsection independently
(iv) Decryption must be possible using a different number of domains than were used to encrypt the data.

Whilst serial streams of data to be encrypted do not need to be exact multiples of the encryption block size (128 bits), it is requirement (iv) that causes this disclosure to work in multiples of the block size.

In the examples described hereinbelow, it can be assumed that the secret key for cryptographic transformation has been securely obtained by each core.

A structured data set 28 is used herein having rows and/or columns of data, e.g. having a number of lines of data and a predetermined number of bits per line. The present disclosure uses a grid based approach to partitioning the data set such that the position of a partition is defined by a number of lines/rows of data at which the partition occurs. For example, a partition may be defined as being located at 'n' lines such that the partition is made between n and n+1 lines. The $n^{th}$ line would thus be contained in one data subset and the next line would be contained in the next data subset.

Whilst blocks of data are defined as multiples of 128 bits for AES algorithm, it will be appreciated that different predetermined block sizes for different encryption/decryption standards could be devised according to the methods disclosed herein.

It is also noted that during decryption, data may be held solely in the RAM/volatile memory of the computer (or distributed over the RAM of many computers). It may be required that decrypted data is never stored on the hard disk of an external or shared computer. That is to say the decryption and processing of the computational model may not be permanently stored to a non-volatile memory by the available cores, but may instead be communicated back to a secure facility for storage.

Alignment of Block Boundaries

In order to ensure that data cannot be partitioned so as to sever the data set in a way that makes the data, or parts of the data, unusable, the data is aligned with a data block structure to be used for the cryptographic transformation process. The data blocks may be aligned with the lines of data, i.e. to provide a whole number of data blocks per line.

The data held on CFD mesh and solution files are typically 32 or 64 bit integers or reals. Whilst these are integer divisors of 128, an arbitrary partitioning of the data may create partitions that are not multiples of 128 bits. However, the CFD data that needs to be protected is vector data. The mesh is stored as (x,y,z) triplets. If 64 bit precision is used, each triplet is 192 bits long. The flow file is typically a sextuplet or septuplet. In double precision, this equates to 384 or 448 bits per entry.

Each domain section reads a full triplet, sextuplet etc. for each mesh point that belongs to the domain section. So, to ensure block alignment each triplet is padded to 256 bits and septuplet to 512 bits. Sextuplets are an integer multiple of 128 and do not require padding.

Figure 5:
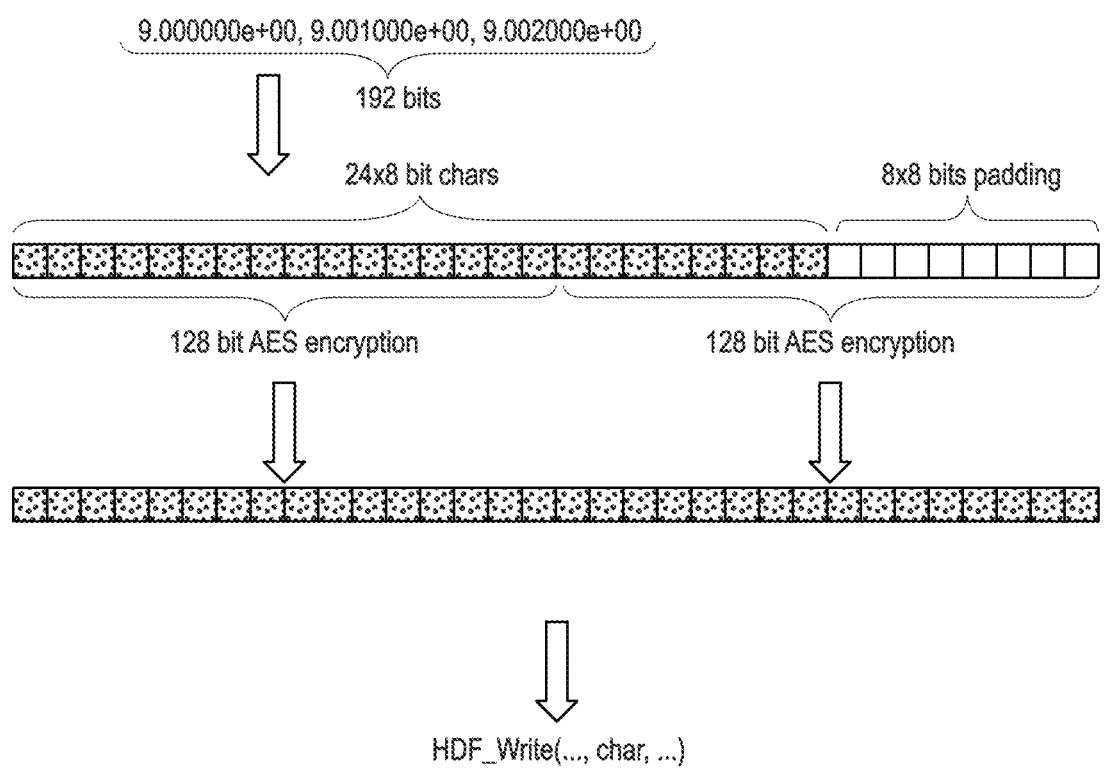
FIG. 5 shows a process of block definition and encryption.

An example is shown in FIG. 5, in which the 192 bits for a Cartesian coordinate triplet is padded with 64 bits to form 256 bits of data (represented as 24×8 characters and 8×8 bits padding) which can be divisible into two 128 bit blocks for AES encryption in order to form an encrypted file that is written to a data store and/or communicated safely as required.

The padding in examples herein may follow the PKCS7 standard but other padding methods could be used if desired.

The above method therefore makes use of the prior knowledge that 3×64 bits are used for grid/mesh points (i.e. a collection of common data) and 6×64 bits for a flow solution (e.g. 5 of which are for flow parameters+1 is for a separate turbulence value). The above method requires only that each vector, array or data set is stored with a fixed number of bits per line of data. The method will pad to the next multiple of 128 bits, if needed.

In various examples of the disclosure, the same data file may contain multiple vectors/arrays, e.g. of different types, each with a different number of bits per line. For example, whilst the mesh/grid point data and the solution/flow data represent the majority of the data, other associated data may, and typically will, be encrypted/decrypted at the same time. In the example of physics-based model data, this could comprise boundary data (e.g. boundary conditions), connectivity data, cords and the like. Alternatively, the metadata structure, e.g. described below in relation to FIG. 14, also allows for a mixture of encrypted and unencrypted data within the same file. This may be used, for example where there is an overhead in encrypting non-sensitive data.

Independent Application of Block Cipher Modes

Figure 6:
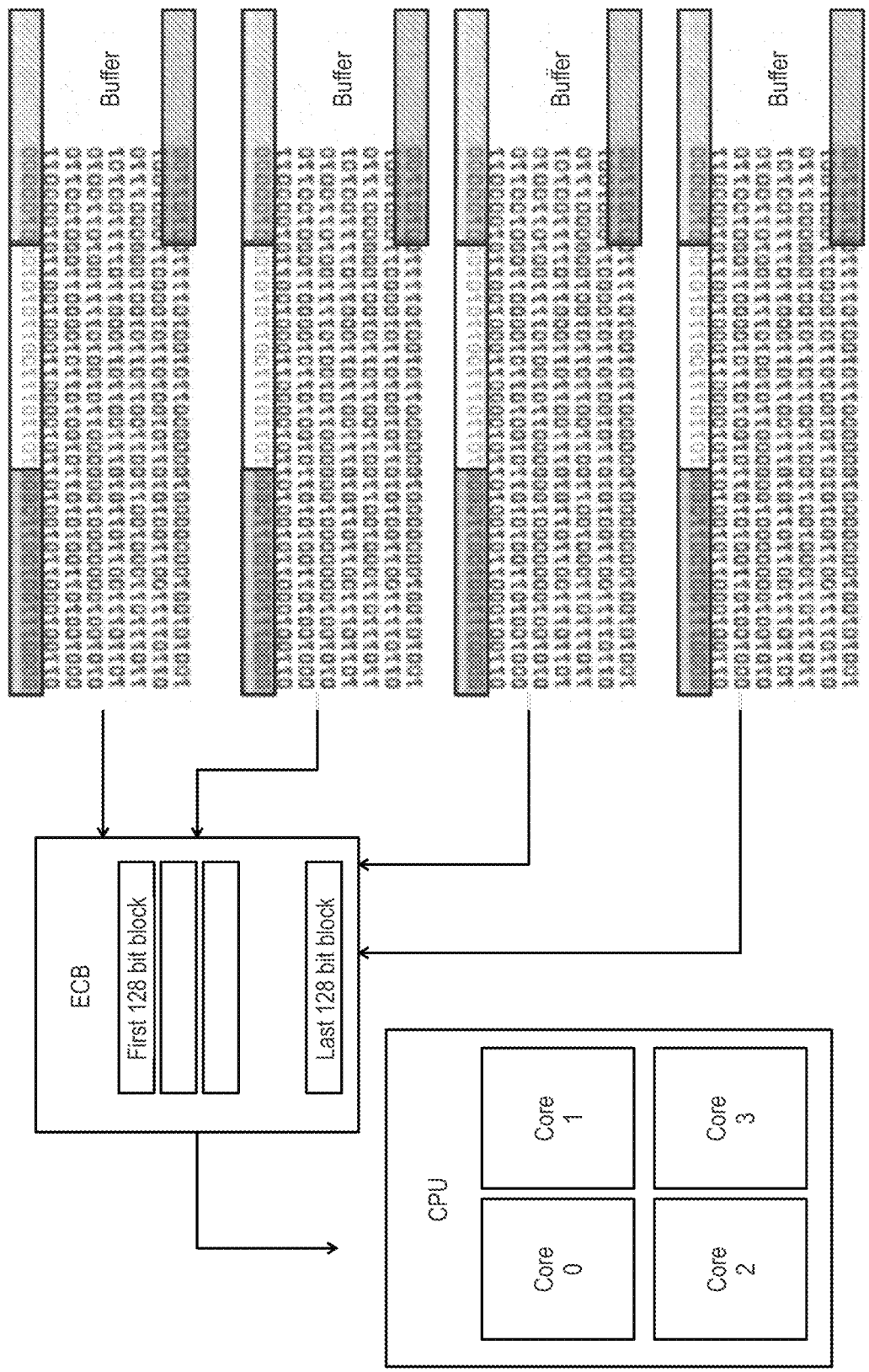
FIG. 6 shows an example method of cryptographic transformation using a first mode.

The original AES mode which reuses an unmodified secret key is called Electronic Codebook (ECB) mode. The electronic cookbook mode can be trivially applied independently to each 128 bit block as shown in FIG. 6 but this is cryptographically weak.

Figure 8:
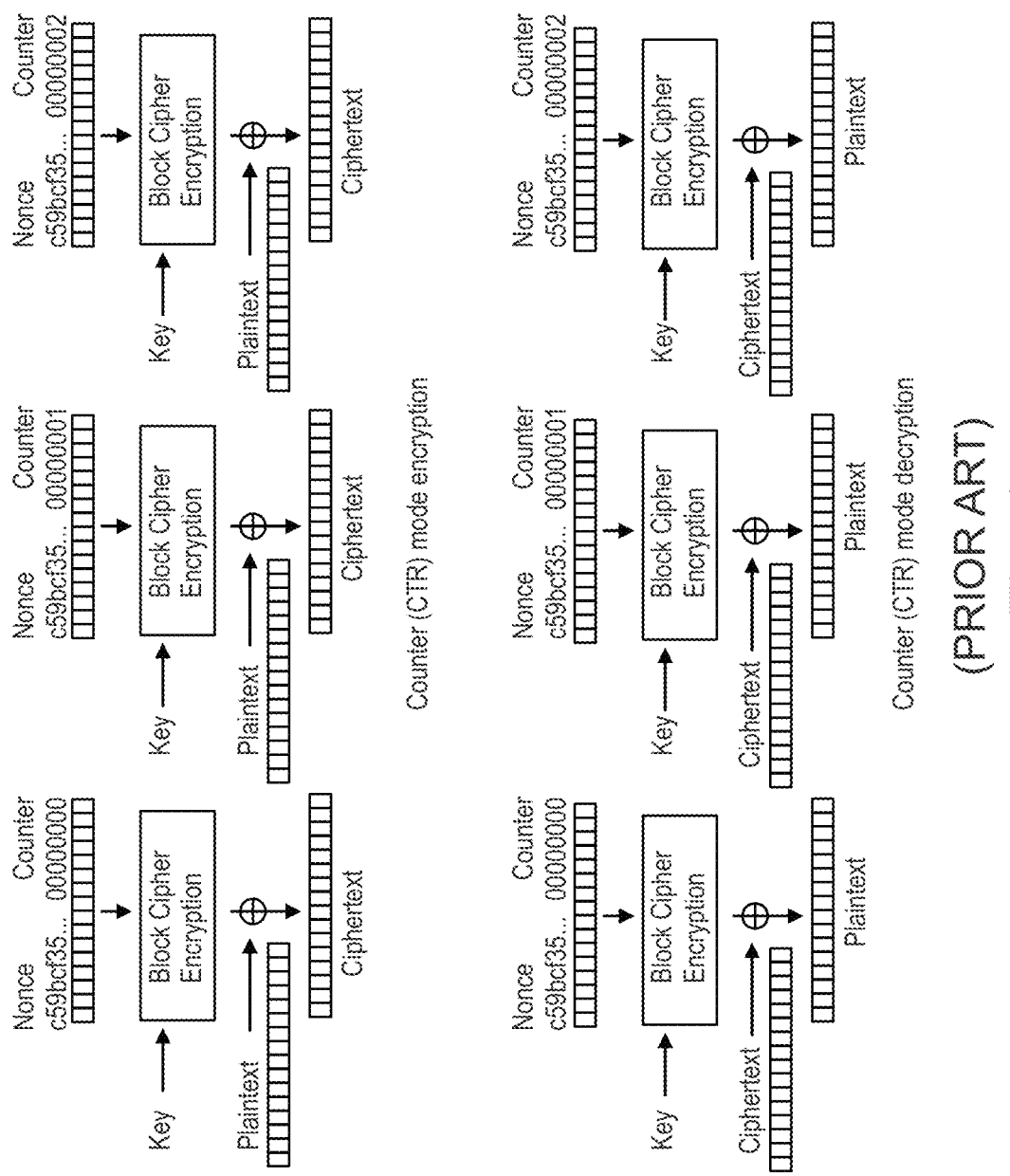
FIG. 8 shows further detail of the block chain encryption and decryption process associated with FIG. 7.
Figure 9:
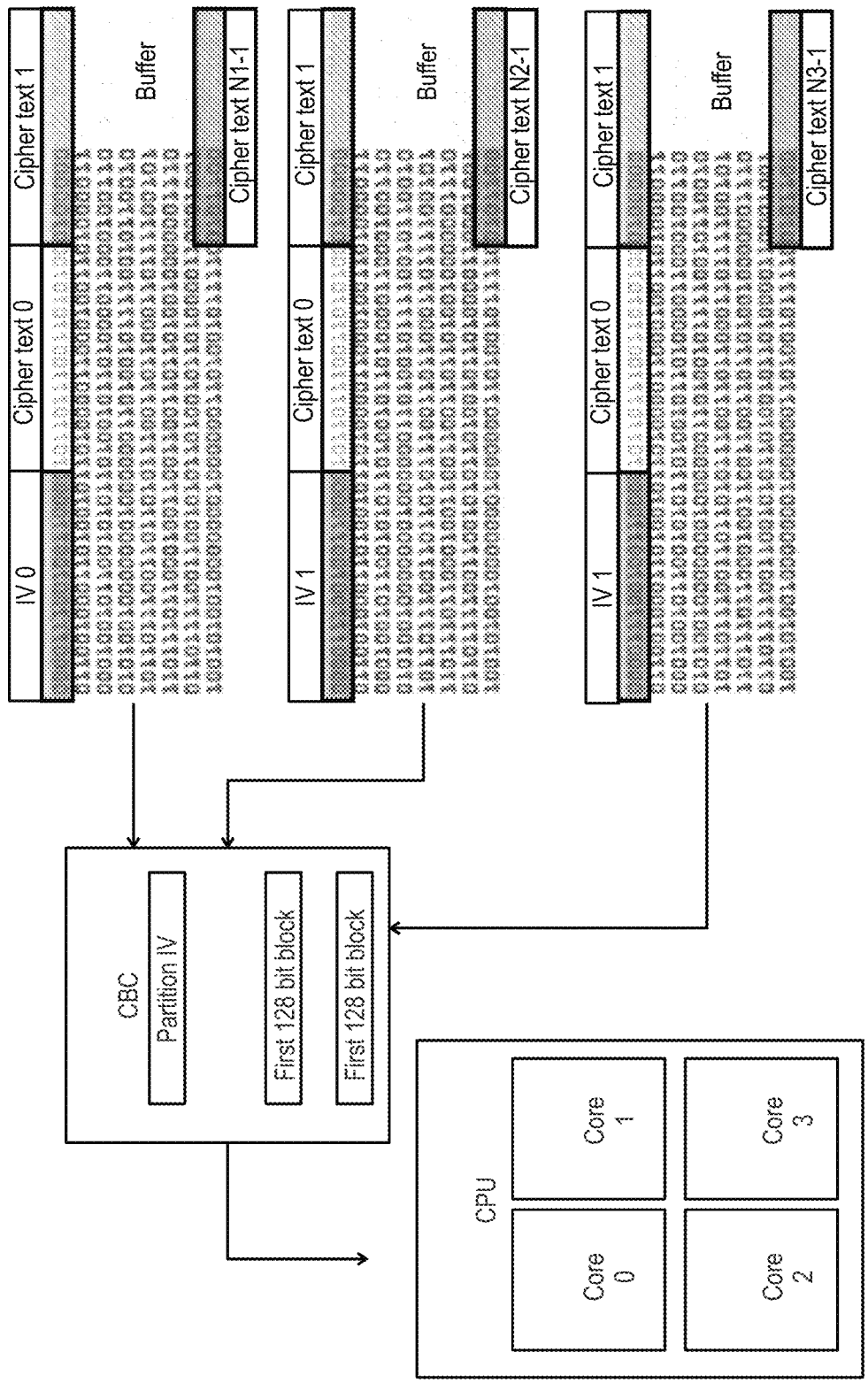
FIG. 9 shows an example method of cryptographic transformation using a third mode
Figure 10:
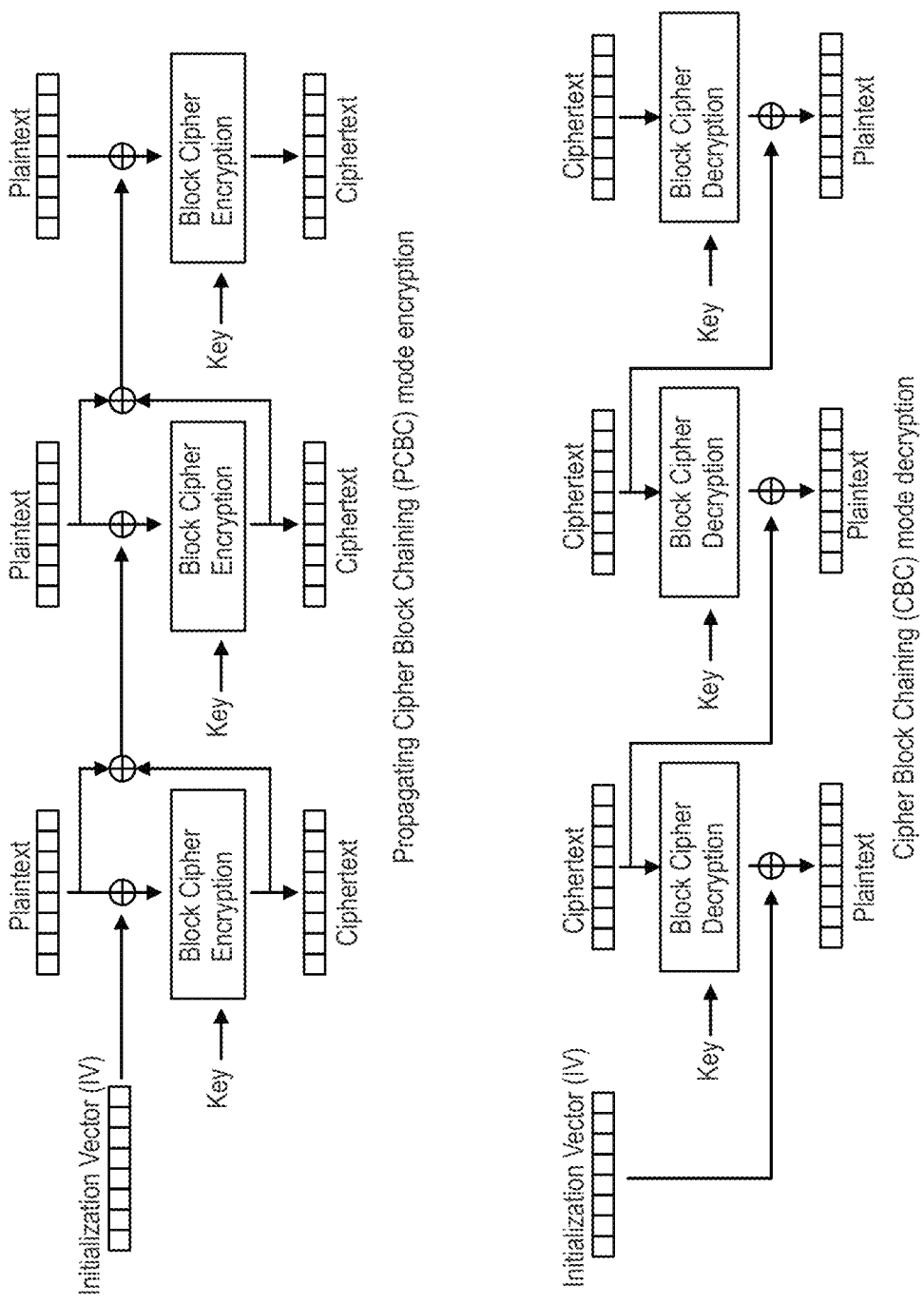
FIG. 10 shows further detail of the block chain encryption and decryption process associated with FIG. 9.

To combat this block cipher modes of operation were introduced in accordance with the present disclosure. These fall into two categories:
(i) Counter (CTR) mode—as shown in FIGS. 7 and 8
(ii) Block chaining and the related feedback modes—as shown in FIGS. 9 and 10

Figure 7:
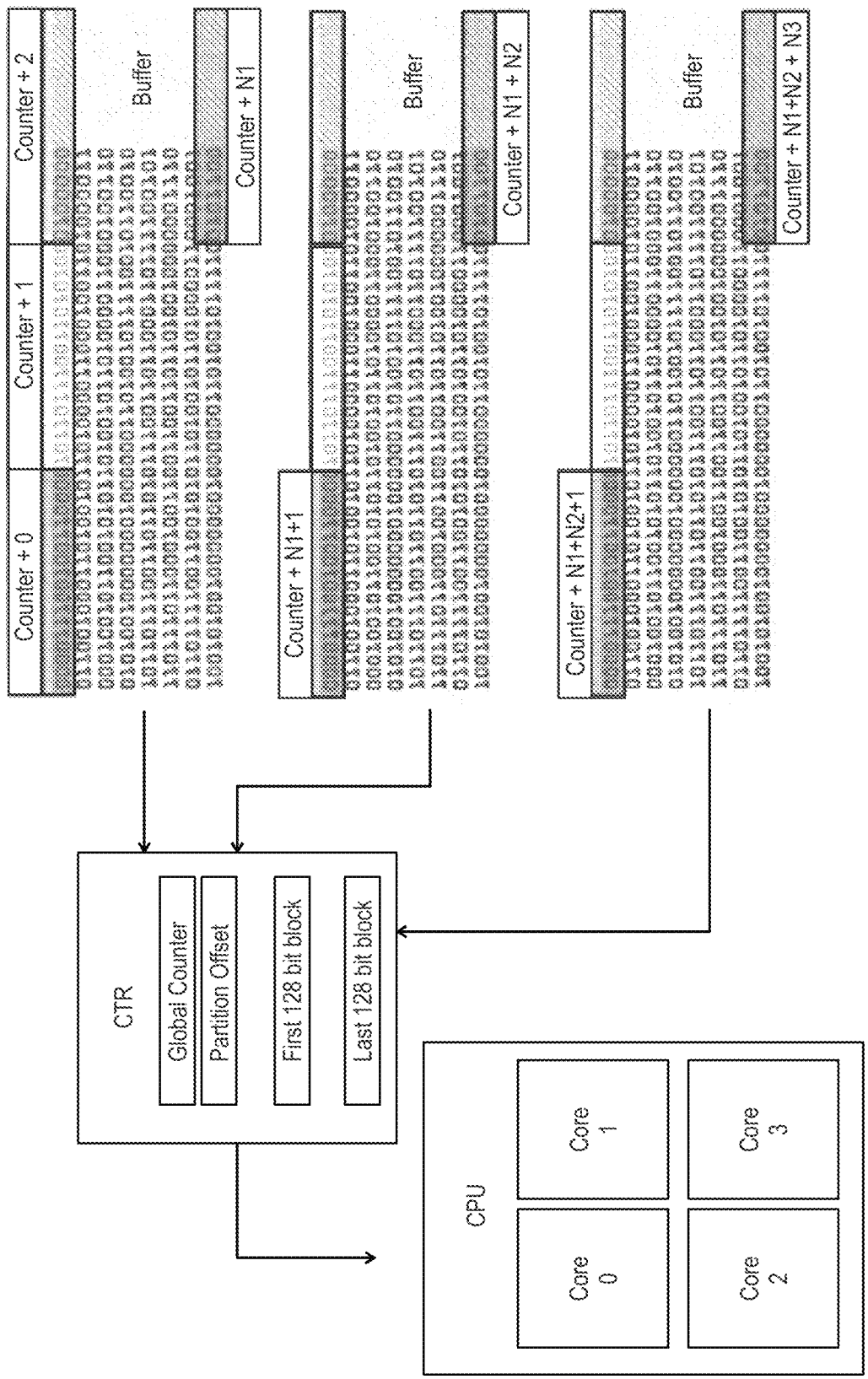
FIG. 7 shows an example method of cryptographic transformation using a second mode.

Turning to FIG. 7, there is shown an implementation using CTR. The cipher key for the first block is supplemented by a random initial vector (IV) or nonce (called the counter). The counter is then advanced by 1 for each subsequent block such that the counter maintains a sequential count associated with each block.

The next keystream block is generated by encrypting the successive values of the counter. The conventional CTR mode encryption and decryption procedure is shown in FIG. 8.

Below are two ways in which the CTR mode could be employed as part of the present disclosure:
  (i) Start the counter at the first point in the mesh and share that with all the partitions so that the counting is continuous across all partitions. This means the partitions cannot perform the encryption independently—they need to know the counter for the first point before they can work out the counter value for the data they own. Once the value for the first point is known for each partition, encryption of the data subsets/subdomains can be performed in parallel. A continuous counter makes decryption straightforward. Once encryption has been performed sequentially for the whole data set, the block count (N1, N2, N3) for each data subset is known and thus the first block, or any other block, in each data subset can be identified along with its associated key based on the position in the sequential count order.
  (ii) Let each partition count independently of the others using its own initial counter/vector. The initial counters are not secret and can be stored on the file. This is simple when the same partitioning is used to read and write the data. If the data has been written using one set of partitions and read with a different set then every grid point must know the initial counter from which it is offset. This may be implemented by way of a search amongst the list of initial vectors. Such a search can be performed quickly/efficiently since the list is many times smaller than the array being decrypted.

Turning to FIGS. 9 and 10, there is shown a cipher block chain (CBC) transformation process. The block chain mode is fundamentally sequential so cannot work with a single initial vector for the entire data set. That is to say, with a single IV, each partition would not be able to start until the final block of the previous partition had been encrypted/decrypted. So, in the example of FIG. 9 each partition uses its own IV which is stored on the file, remembering that this is not a secret.

Independence of Encryption and Decryption Processes

A key observation is that whilst block chaining is sequential in FIGS. 9-10, there will be multiple initial vectors distributed throughout the assembled data, each IV correlating to the first block in sequence of a different data subset defined during the original partitioning.

The presence of multiple IVs distributed throughout the assembled data only contaminates the adjacent block. So, if a different partitioning is applied, the use of the block chain mode would produce a set of blocks that have been incorrectly decrypted. Effectively there would be as many incorrect blocks as there were partitions used to encrypt the data.

However, with a simple data structure we can store both the location of the/those blocks and the initial vector used to encrypt them. It is then a matter of locating those blocks and decrypting them with the correct initial vector. The necessary data is stored on the file and can be read by all the partitions so they can perform the decryption independently. The incorrect blocks can thus be compared to the available IVs using a search procedure in order to determine the correct IV for each relevant block. As discussed above, this search is efficient because the list of IVs is significantly smaller than the size of the data set (i.e. the mesh data).

In different examples, the order of the IV table/list (e.g. an ascending order of file position) can be used to implement advanced search algorithms (e.g. tree search) to maintain efficiency for large numbers of cores.

Figures 13, 14:
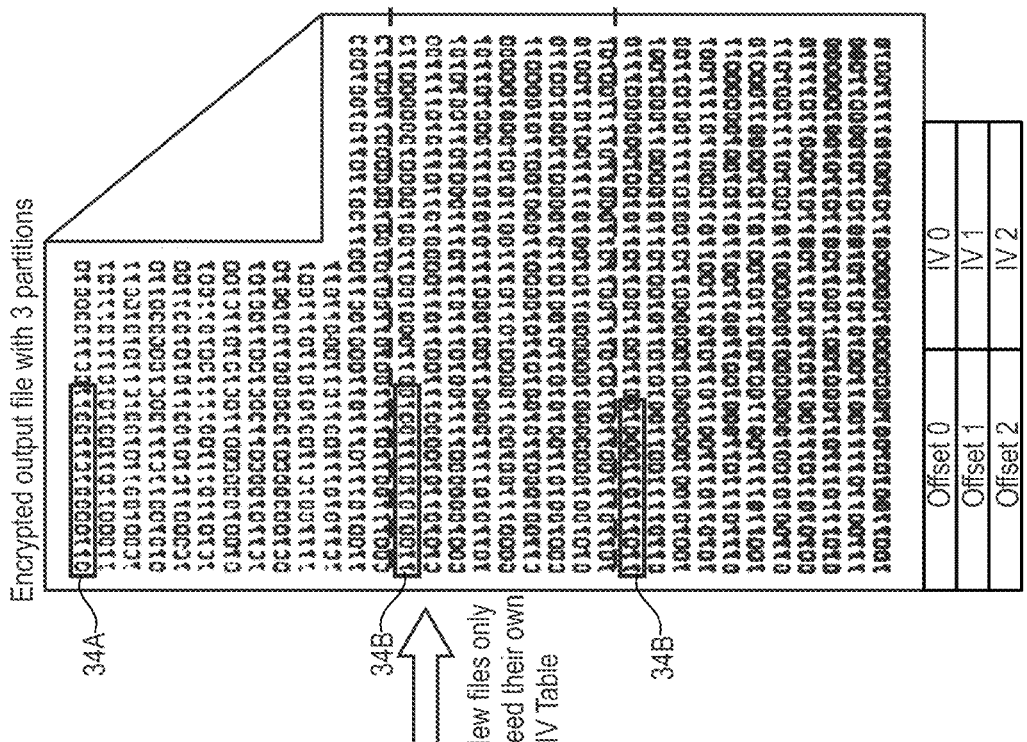
FIG. 13 shows an encrypted output file or data set output generated after the decryption of FIG. 12.
FIG. 14 shows an example of the data and metadata for separate encryption and/or storage.

Turning to FIGS. 11 to 13, the relevant location in the data structure of a partition 16 or the first block 34 for each data subset (e.g. the first block 34A of the data set as a whole or else the first block 34 immediately following a partition 16) is logged along with the associated initial vector (IV0, IV1, IV2, IV3, etc) in a table 36 or another relevant format accompanying the file. The table 36 can be searched or otherwise interrogated in order to determine the relevant IV for a known partition/block offset value.

In FIG. 11, there is shown a schematic of a file encrypted using four data subsets, i.e. three partitions 16. All blocks except the first ones 34, 34A can be decrypted without an IV. Those block locations can be stored on file with the IV.

When decrypting in serial, the following process can be used:
Find and decrypt the first blocks using IVs
Store plain text for the first blocks 34
Decrypt entire file
Replace the first blocks with stored plain text Turning to FIG. 12, there is shown a process for decrypting in parallel, e.g. using different a different number of partitions 16A and data subsets than those used for the encryption process in FIG. 11. The location of the partitions 16A will therefore differ to the partitions 16.

In this example, only the first block 34A of the data set may be common with the first block 34A when encoded. The first block 34B of each subsequent partition/data subset was encrypted using last block 34C from previous line. The first blocks 34B are different in number and location to the blocks 34.

When decrypting in parallel using new partitioning 16A, the following may be performed for each new data partition or it associated data subset:
Find and decrypt the blocks 34 using IVs (i.e. the blocks that were the previous first blocks of the subsets used during encryption). This may be achieved using the known global offsets in table 36.
Store plain text for blocks 34
The partition boundary 34B lies in the interior of a subset used during encryption. The first block was encrypted using the ciphertext of the previous block which corresponds to the final 128 bits of the preceding row of data. This is effectively the IV for subset starting at partition 34B. However, this data now belongs to another subset so it must be read from the file in order to make it available to the current subset.
Read cipher text of blocks 34C from file and set as IV
Decrypt entire partition/subset
Replace blocks 34 with stored plain text When the application using the partitioning shown in FIG. 12 comes to write an encrypted dataset as shown in FIG. 13, the version of table 36 used to decrypt the file can be discarded and the encrypted data is provided with a new table 36A that is appropriate to its partitioning. It is cryptographically weak to re-use IVs, so even if the partition boundaries have not moved, new IVs can be generated and stored in table 36A.

In the above manner, the table 36 is updated with the new entries for the IV accompanying the offset values for the blocks 34B Turning to FIG. 14, there is shown an example of how a file structure for performing the read/write and encryption/decryption processes described herein. The encryption data is stored in a separate metadata array or set 37 which gives the type and width of the unencrypted data. This cannot be discerned from the encrypted data as this is just a sequence of 128 bit encrypted blocks. The IVs and their offsets are also stored in the metadata 37.

The file structure is therefore flexible in that it can comprise a core set of encrypted, structured data as well as other types of encrypted or unencrypted data. Different sets of encrypted data could have different keys as necessary.

The existence of the metadata array may be used as a flag to indicate that the corresponding data array is encrypted. This allows both encrypted and unencrypted data to be stored on the same file. Some data such as mesh connectivity is not sensitive and processing time can be saved by only encrypting sensitive data such as the grid coordinates.

The use of metadata further allows the easy extension of the file input/output layer or library in an application code to be easily extended to add encryption capability whilst maintaining backwards compatibility with prior non-encrypted files. To a user the code execution would remain as before including the specification of the number of cores to be used for the calculation.

Figure 15:
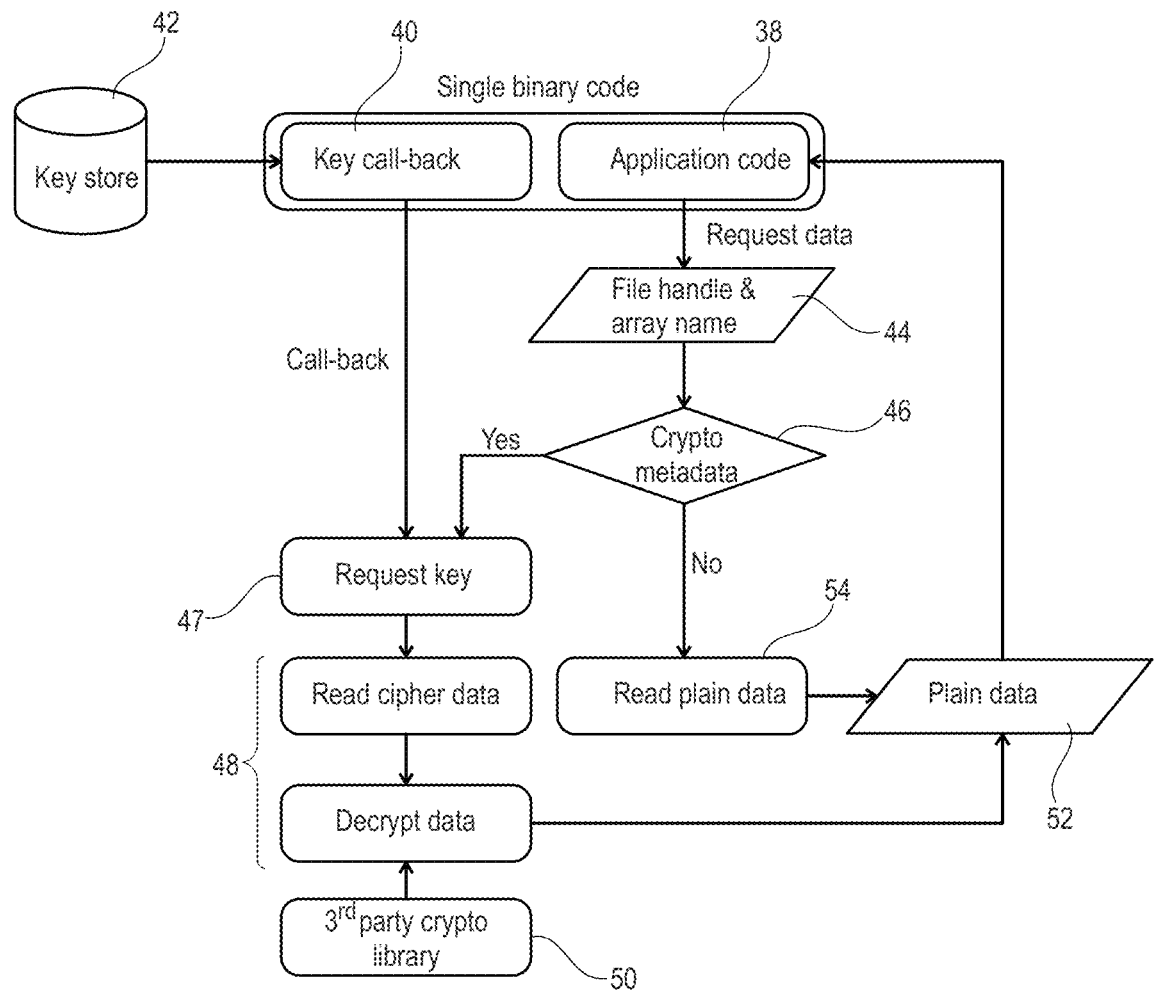
FIG. 15 shows a computational system for managing a cryptographic transformation process according to an example of the disclosure.

Turning now to FIG. 15, there is shown a flow chart for managing the cryptographic transformation process, and/or processing of the decrypted data. A single instance is shown but the relevant steps of FIG. 15 can be performed for each core. It will be appreciated by the skilled person that during the encryption process the relevant cryptographic keys can be stored in a secure data store 42 for later retrieval.

Application code 38 is run and can communicate with a memory/key manager, depicted in FIG. 15 by a memory read/write function 40 in communication with a data store 42.

At step 44 the application code receives a file and one or more suitable identifier, such as a file name/handle and a name/identifier for the data set/array contained in the file.

At step 46 a check is performed to determine whether any cryptography meta data is present on the received file. The metadata could comprise any or any combination of the initialisation vector data, offset data or any other partition data described herein, such as the encryption metadata disclosed in FIG. 14. The check could be performed for the metadata itself, its identifier/handle and/or its data structure.

If the requisite cryptographic meta data is identified, a key request is made at 47 and the key manager obtains from the data store 42 the relevant key(s) according to the file/data identifier(s) provided. The request for the key can be made in combination with the name, or other properties, of the array, allowing for a file to be encrypted with a multiplicity of keys. This means an attacker would have to break multiple keys to gain full access to the contents of the file.

The cipher data is read and decrypted using the key(s) at 48, e.g. in conjunction with a further/third-party cryptographic library 50, and the resulting plain text/data 52 is then processed according to the application code 38.

As also shown in FIG. 15, where no meta data is present for a data block, portion or subset, the application code 38 may read the plain/unencrypted data directly at 54. The whole plain data file 52 may be constructed from unencrypted data and encrypted data that has been decrypted using the retrieved cipher/key data.

Using the above described system, key callback routines and data processing can be run for multiple cores in parallel. A cryptography manager may perform core-related operations and error checking, for example maintaining activity and error log entries.

A skilled person will appreciate that the process described in FIG. 15 can be used to write encrypted files with the same level of granularity between encrypted and unencrypted data and choice of one or many keys. The key callback structure shown in FIG. 15 may allow for fine grain control of encryption keys, e.g. to the point that each vector/array can have a different key, giving protection that an attacker would have to break multiple keys to gain full access to the contents of the file.

The advantages offered by examples of the present disclosure comprise:
Data sets may be partitioned at any location, e.g. according to the available number of cores;

Successive encryption/decryption cycles may use different partitions;

Strong cryptographic modes can be used;

The auxiliary data structure accompanying the file may be relatively simple (e.g. comprising a list/table of blocks and initial vectors); and/or Integrity of the encrypted file is maintained so it can always be decrypted Different data sets may be encrypted with a different key making it harder for an attacker to gain full access to the file.

The use of an auxiliary data structure for the purpose of facilitating block chaining in parallel, e.g. with the ability to encrypt and decrypt files using different partitions, is believed to be novel.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of cryptographic transformation of a structured data set comprising:
   partitioning the structured data set into a first subset and a plurality of further subsets to define a first number of data subsets;
   dividing the subsets into a plurality of blocks of predetermined size;
   identifying a first block for each subset and a location of each further block in said subset relative to said first block of its subset;
   cryptographically transforming the subsets using a key according to a cipher block chain process, the cryptographically transforming comprising encrypting the data set in parallel using a number of cores corresponding to the first number of data subsets;
   logging an offset value for the first block of each subset from the first block of the first subset;
   subsequently partitioning the encrypted data set using a second number of data subsets, wherein the second number is different from the first number of data subsets; and
   decrypting the data set in parallel using a number of cores corresponding to the second number of data subsets.

2. A method according to claim 1, comprising identifying a number of available cores for the cryptographic transformation and partitioning the structured data set into the first number of data subsets based on said number of available processors, wherein one or more of the subsets is assigned to each core.

3. A method according to claim 1, wherein the offset value comprises a location/position in the data set structure relative to the first block of the first subset.

4. A method according to claim 1, comprising using a different initialisation vector for the first block in each subset and logging a record of said initialisation vectors.

5. A method according to claim 4, comprising maintaining a list or table correlating each initialisation vector to an offset value.

6. A method according to claim 5, comprising updating an existing instance of the list or table with new offset values and/or initialisation vectors when a current partitioning the structured data set differs from a previous partitioning of the structured data set.

7. A method according to claim 1, wherein the first block in each subset is a leading block in an ordered sequence of the blocks in a subset based on the proximity to the first block of the first subset.

8. A method according to claim 1, wherein the first block in each subset is not a leading block in the subset in an ordered sequence of the blocks in said subset based on the proximity to the first block of the first subset, wherein the first block of each subset is decrypted according to said offset value.

9. A method according to claim 1, wherein the first block in each further subset comprises a sequential identifier which follows in sequence from the sequential identifier of a last block of a preceding data subset.

10. A method according to claim 9, wherein the sequential identifier comprises a block count value and the block chain process comprises a counter mode.

11. A method according to claim 1, wherein the cipher block chain process comprises a cypher block chain encryption/decryption mode.

12. A method according to claim 1, wherein the decrypting the data set comprises:
    identifying and decrypting one or more first block contained in each subset using an initialisation vector corresponding to the offset value for the first block;
    storing plain text for each identified first block;
    decrypting the blocks for each subset; and
    replacing the decrypted first block with the stored plain text.

13. A method according to claim 1, wherein the first number of data subsets is equal to, or a multiple of, the first number of cores and/or the second number of data subsets is equal to, or a multiple of, the second number of cores.

14. A method according to claim 1, wherein the decrypting the data set comprises decrypting the blocks of one or more of the subsets, identifying incorrectly decrypted blocks, matching each incorrectly decrypted block with a stored initialisation vector and decrypting said blocks with said initialisation vectors.

15. A method according to claim 1, comprising dividing each line of data in the data set into a whole number of blocks of predetermined size and padding the data of one or more block in order to meet the predetermined block size.

16. A method according to claim 1, wherein the structured data set comprises geometric point data of a geometric model and/or one or more variable at each point of a physics-based computational model.

17. A non-transitory data storage medium comprising machine readable instructions for one or more of a plurality of processors to:
    partition a structured data set into a first subset and a plurality of further subsets to define a first number of data subsets;
    divide the subsets into a plurality of blocks of predetermined size;
    identify a first block for each subset and a location of each further block in said subset relative to said first block of its subset;
    cryptographically transform the subsets using a key according to a cipher block chain process, the cryptographically transform comprising an encryption of the data set in parallel using a number of the processors corresponding to the first number of data subsets;
    store in a non-volatile memory an offset value for the first block of each subset from the first block of the first subset;

partition the encrypted data set using a second number of data subsets, wherein the second number is different from the first number of data subsets; and decrypt the data set in parallel using a number of the processors corresponding to the second number of data subsets.

18. A system comprising a plurality of computer processors, the computer processors configured to perform a cryptographic transformation process in parallel across the plurality of computer processors, wherein cryptographic transformation process includes:

partitioning the structured data set into a first subset and a plurality of further subsets to define a first number of data subsets;

dividing the subsets into a plurality of blocks of predetermined size;

identifying a first block for each subset and a location of each further block in said subset relative to said first block of its subset;

cryptographically transforming the subsets using a key according to a cipher block chain process, the cryptographically transforming comprising encrypting the data set in parallel using a number of the computer processors corresponding to the first number of data subsets;

logging an offset value for the first block of each subset from the first block of the first subset;

subsequently partitioning the encrypted data set using a second number of data subsets, wherein the second number is different from the first number of data subsets; and decrypting the data set in parallel using a number of the computer processors corresponding to the second number of data subsets.

* * * * *